US009098677B2

(12) United States Patent
Holloway

(10) Patent No.: US 9,098,677 B2
(45) Date of Patent: Aug. 4, 2015

(54) SYSTEM AND METHOD FOR AUTOMATED CLOCK WIND BACK RECOVERY

(75) Inventor: Mark R Holloway, Reading (GB)

(73) Assignee: Flexera Software LLC, Itasca, IL (US)

(*) Notice: Subject to any disclaimer, the term of this patent is extended or adjusted under 35 U.S.C. 154(b) by 975 days.

(21) Appl. No.: 12/468,513

(22) Filed: May 19, 2009

(65) Prior Publication Data

US 2010/0299723 A1    Nov. 25, 2010

(51) Int. Cl.
G06Q 99/00 (2006.01)
G06F 21/10 (2013.01)
G06F 21/00 (2013.01)

(52) U.S. Cl.
CPC ............... *G06F 21/10* (2013.01); *G06F 21/00* (2013.01); *G06F 2221/2137* (2013.01); *G06Q 2220/10* (2013.01); *G06Q 2220/12* (2013.01); *G06Q 2220/18* (2013.01)

(58) Field of Classification Search
CPC .......... G06Q 2220/10; G06Q 2220/12; G06Q 2220/18; G06F 21/00; G06F 21/10
USPC .................... 705/50, 51, 59; 726/27
See application file for complete search history.

(56) References Cited

U.S. PATENT DOCUMENTS

| | | | |
|---|---|---|---|
| 7,146,559 B2 * | 12/2006 | Sakuma ..................... 714/814 |
| 2002/0019814 A1 * | 2/2002 | Ganesan ..................... 705/59 |
| 2003/0105890 A1 * | 6/2003 | Sakuma ........................ 710/1 |
| 2005/0289072 A1 * | 12/2005 | Sabharwal ................... 705/59 |
| 2007/0143462 A1 * | 6/2007 | Venkatachalam et al. .... 709/223 |
| 2008/0089516 A1 * | 4/2008 | Cocchi et al. ............... 380/200 |
| 2009/0083372 A1 * | 3/2009 | Teppler ....................... 709/203 |

* cited by examiner

*Primary Examiner* — James D Nigh

(74) *Attorney, Agent, or Firm* — Michael A. Glenn; Perkins Coie LLP

(57) ABSTRACT

A method and system for automated clock wind-back recovery are disclosed. According to one embodiment, a computer-implemented method comprises requesting a license to access an application and storing a time anchor, the time anchor comprising a recent system time observation. Clock modification is detected, wherein detecting clock modification comprises comparing a license expiration date to a current system time. The time anchor is compared to a trusted time authority value, the trusted time authority value comprising the current system time and a tolerance. The time anchor is updated, clock modification is corrected, and access to the application is retrieved.

1 Claim, 6 Drawing Sheets

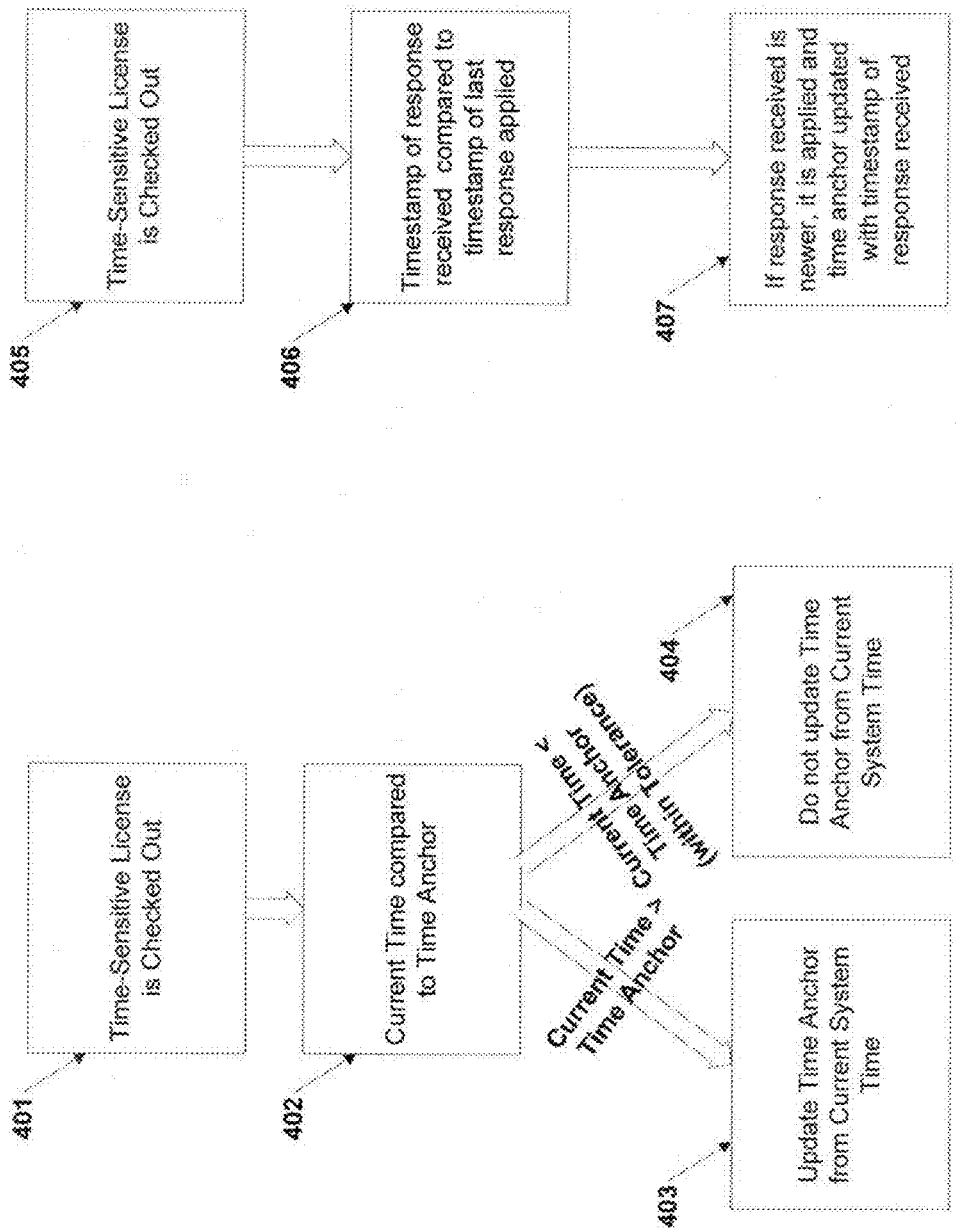

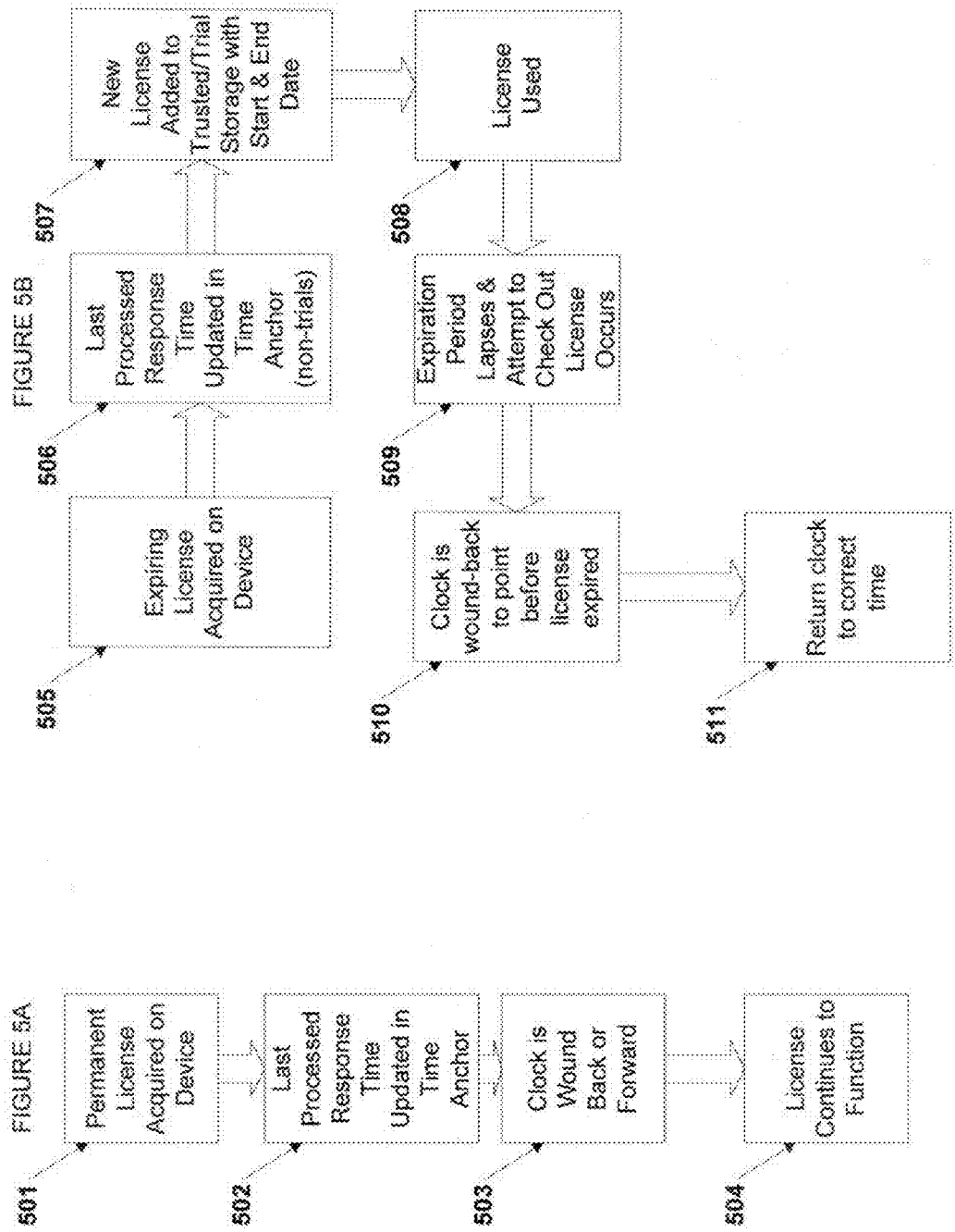

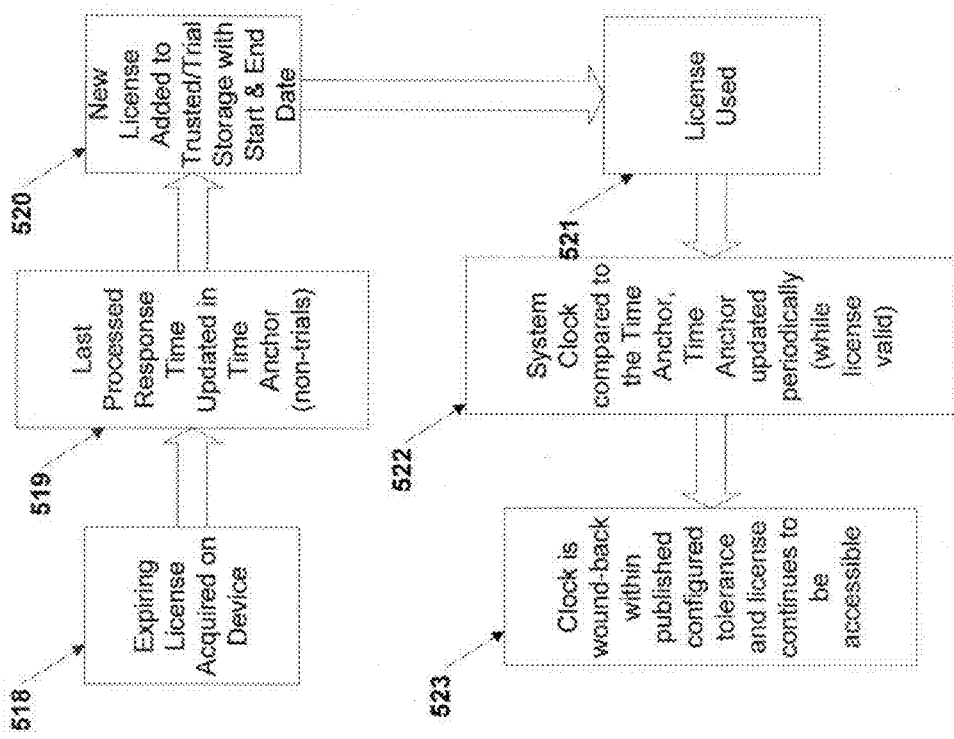
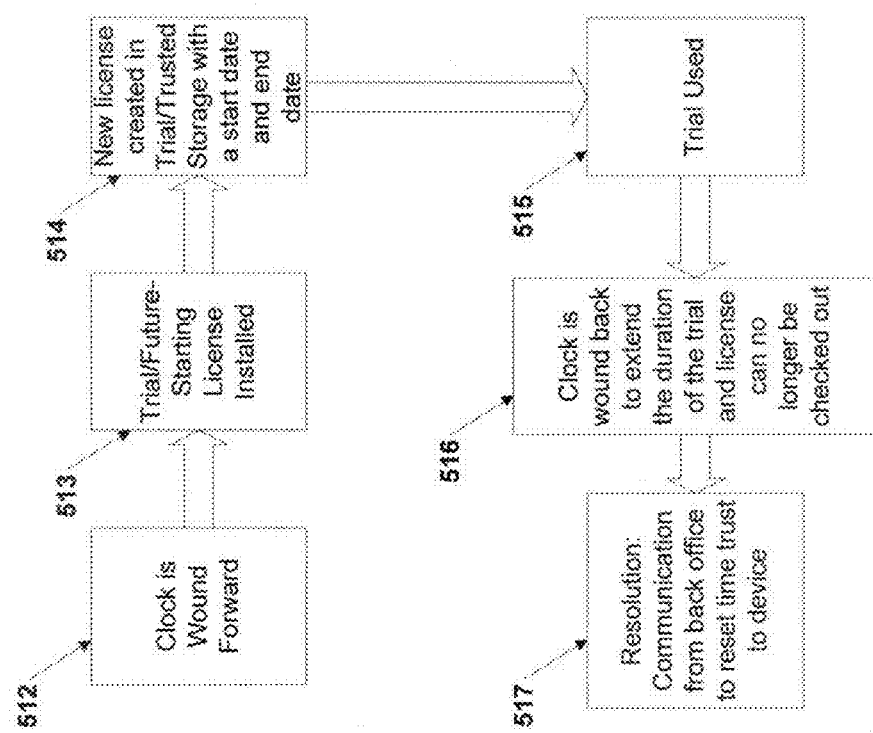

US 9,098,677 B2

SYSTEM AND METHOD FOR AUTOMATED CLOCK WIND BACK RECOVERY

FIELD

The present invention relates generally to computer systems and more particularly to a method and a system for automated clock wind back recovery.

BACKGROUND

Device manufacturers commonly sell products into different markets or price points, though the devices have similar bills of material and/or manufacturing cost. The manufacturer differentiates the devices by the capabilities they offer, for example a device with fewer capabilities may sell for a lower price than the same device with additional or more sophisticated capabilities. Issues arise when customers become interested I upgrading a device for more capabilities. A customer may have initially desired a device with fewer capabilities at the lower price point, and later decided the more sophisticated (and, consequently perhaps, more expensive) suite of capabilities is necessary or preferred. In terms of licensing, rights are defined on a host and licensed software is tied to a particular hardware identity, thus limiting upgrade opportunities or hardware substitution.

An upgrade for a particular device can involve licensing a new application to provide a new functionality on the device. Some licenses are purchases in a permanent capacity, meaning they never expire. Other licenses can have expiration dates or times, while others are considered trial licenses. A user may usually request a new license when an expiration date or time has been reached, or when a trial has ended. Manufacturers and application publishers are faced with the challenge of users altering the clock on a device to provide for a longer period of use of the licensed application than was originally agreed to.

A method and system for automated clock wind-back recovery are disclosed. According to one embodiment, a computer-implemented method comprises requesting a license to access an application and storing a time anchor, the time anchor comprising a recent system time observation. Clock modification is detected, wherein detecting clock modification comprises comparing a license expiration date to a current system time. The time anchor is compared to a trusted time authority value, the trusted time authority value comprising the current system time and a tolerance. The time anchor is updated, clock modification is corrected, and access to the application is retrieved.

BRIEF DESCRIPTION

The accompanying drawings, which are included as part of the present specification, illustrate the presently preferred embodiment and together with the general description given above and the detailed description of the preferred embodiment given below serve to explain and teach the principles of the present invention.

FIG. 4A is an exemplary flow for a time anchor update process within an automated clock wind back recovery system, according to one embodiment.

FIG. 4B is an exemplary flow for a time anchor update process within an automated clock wind back recovery system, according to one embodiment.

FIG. 5A is an exemplary flow for a permanent license evaluation within an automated block wind back recovery system, according to one embodiment.

FIG. 5B is an exemplary flow for an expiring license evaluation within an automated block wind back recovery system, according to one embodiment.

FIG. 5C is an exemplary flow for a clock wind back process within an automated block wind back recovery system, according to one embodiment.

FIG. 5D is an exemplary flow for a clock wind back process within an automated block wind back recovery system, according to one embodiment.

DETAILED DESCRIPTION

Figure 1:
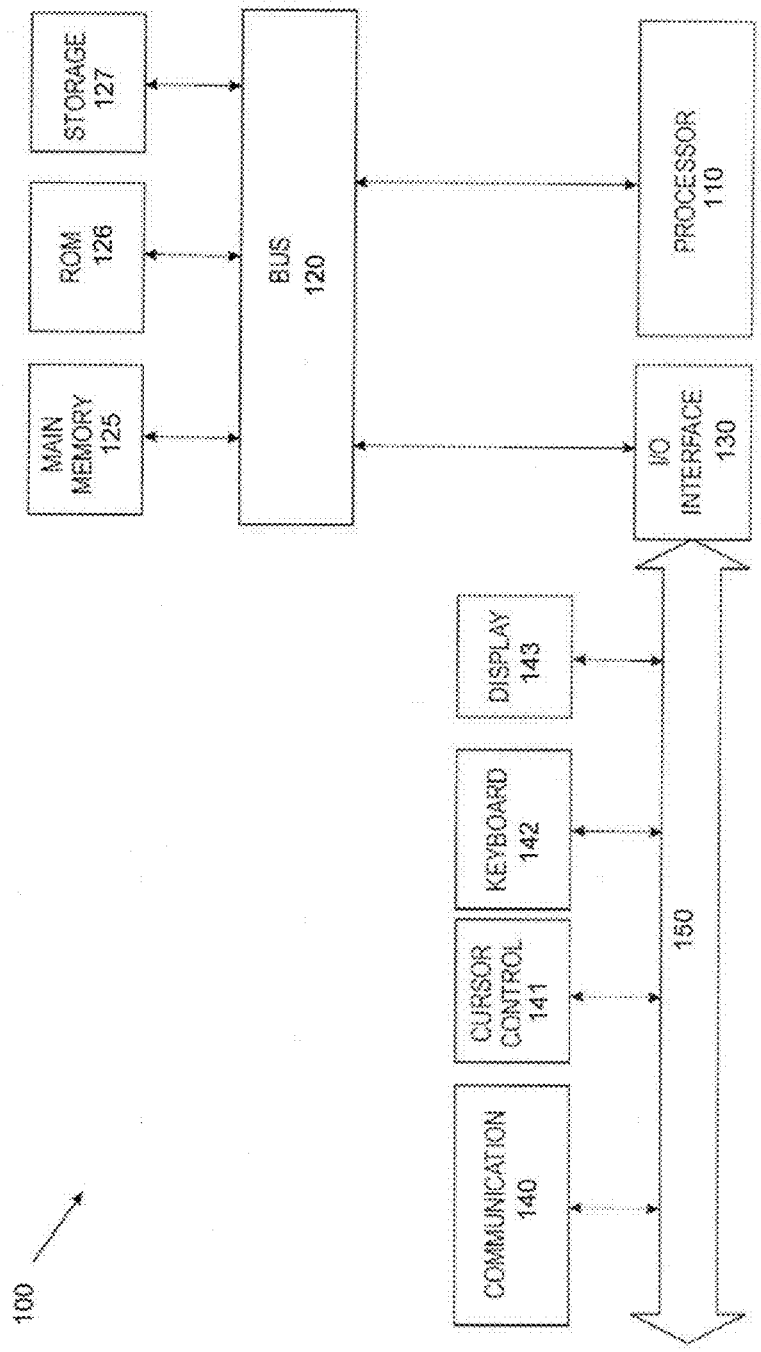
FIG. 1 illustrates an exemplary computer architecture for use with the present system, according to one embodiment.

A method and system for automated clock wind-back recovery are disclosed. According to one embodiment, a computer-implemented method comprises requesting a license to access an application and storing a time anchor, the time anchor comprising a recent system time observation. Clock modification is detected, wherein detecting clock modification comprises comparing a license expiration date to a current system time. The time anchor is compared to a trusted time authority value, the trusted time authority value comprising the current system time and a tolerance. The time anchor is updated, clock modification is corrected, and access to the application is retrieved.

The present method and system utilize a time anchor that is a secure record of the most recent system time observed (by some definition). Preferably the time anchor is stored in a secure location. Clock wind-back detection is accomplished by comparing the current system time (as reported by the publisher callout) with this value.

Clock wind-back applies to time sensitive licenses, i.e. those with a start date or an expiration date. Some licenses may be issued with a start date in the future. There is minimal cost for this solution where clock wind-back is not used.

Wind-back tolerance, as set by the publisher of a licensed application, can be the same for every license on the device or can be overridden and specified as part of an issued license.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. A method is here, and generally, conceived to be a self-consistent process leading to a desired result. The process involves physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present method and system also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the method and system as described herein.

FIG. 1 illustrates an exemplary computer architecture for use with the present system, according to one embodiment. One embodiment of architecture 100 comprises a system bus 120 for communicating information, and a processor 110 coupled to bus 120 for processing information. Architecture 100 further comprises a random access memory (RAM) or other dynamic storage device 125 (referred to herein as main memory), coupled to bus 120 for storing information and instructions to be executed by processor 110. Main memory 125 also may be used for storing temporary variables or other intermediate information during execution of instructions by processor 110. Architecture 100 also may include a read only memory (ROM) and/or other static storage device 126 coupled to bus 120 for storing static information and instructions used by processor 110.

A data storage device 127 such as a magnetic disk or optical disc and its corresponding drive may also be coupled to computer system 100 for storing information and instructions. Architecture 100 can also be coupled to a second I/O bus 150 via an I/O interface 130. A plurality of I/O devices may be coupled to I/O bus 150, including a display device 143, an input device (e.g., an alphanumeric input device 142 and/or a cursor control device 141).

The communication device 140 allows for access to other computers (servers or clients) via a network. The communication device 140 may comprise one or more modems, interface cards, wireless network interfaces or other well known interface devices, such as those used for coupling to Ethernet, token ring, or other types of networks.

Figure 2:
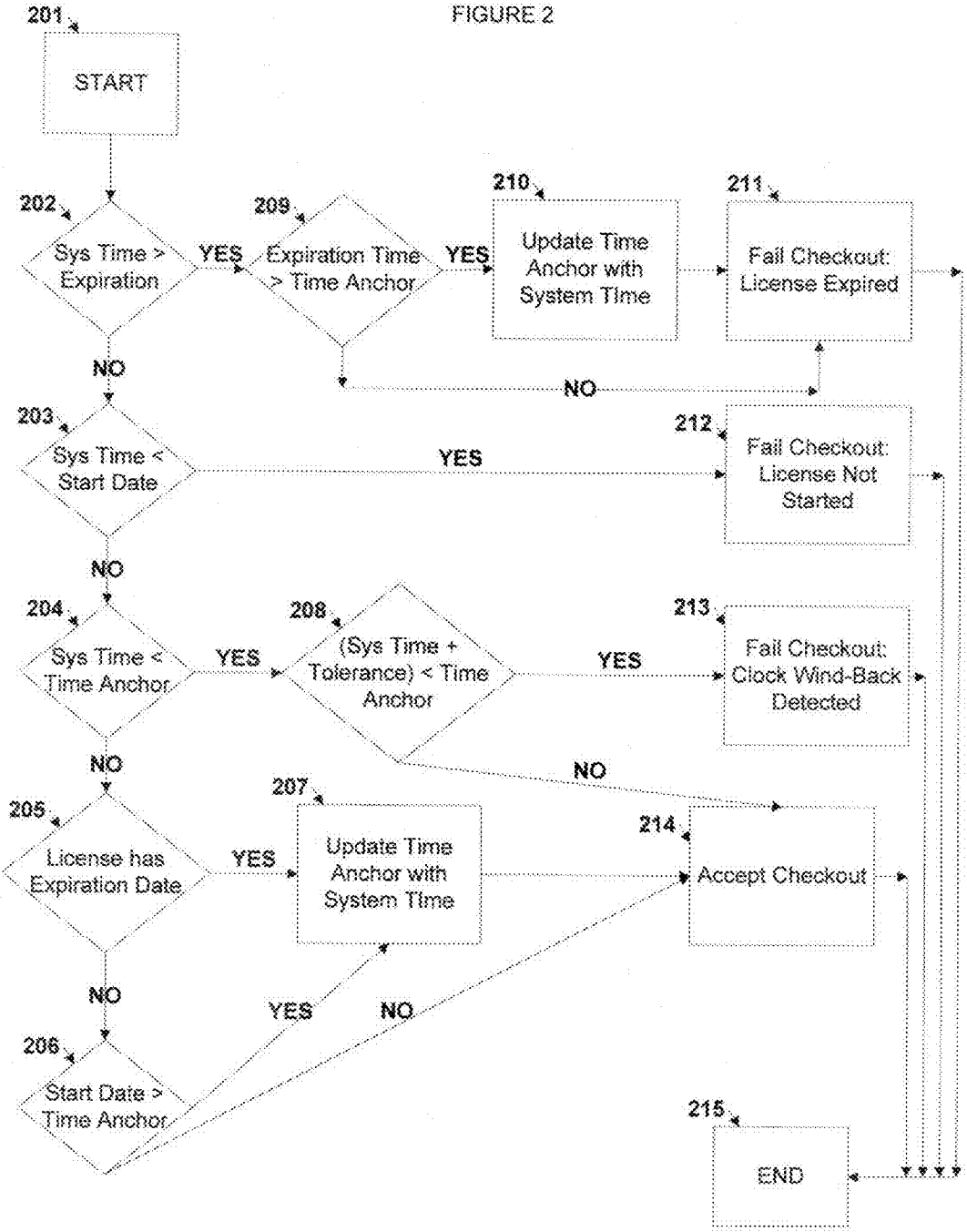
FIG. 2 is an exemplary flow for an automated clock wind back recovery process, according to one embodiment of the present system.

FIG. 2 is an exemplary flow for an automated clock wind back recovery process, according to one embodiment of the present system. An automated clock wind back recovery process starts 201 and the current system time is compared to a license expiration 202. If the current system time is greater than the expiration of a license 202, then the expiration time is compared to the time anchor 209. If the expiration time is greater than the time anchor, then the time anchor is updated with the current system time 210 and the checkout of a license fails because the license has expired 211 and the process ends 215. If the expiration time is not greater than the time anchor 209, then the checkout of a license fails because the license has expired 211 and the process ends 215 (the time anchor is not updated with the current system time in this case). The time anchor is updated with the current system time 210 when a publisher defined period has elapsed, according to one embodiment.

If the current system time is not greater than the license expiration 202 and the system time is less than the license start date 203 then a license checkout fails because the license has not started 212 and the process ends 215. In the event the system time is not greater than the expiration time 202 nor less than the start date 203, then it is compared to the time anchor 204. If the system time is less than the time anchor 204, then a value is calculated by copying the system time and adjusting it per a designated tolerance (configurable by the manufacturer) and that value is compared to the time anchor 208. Note, the system time itself is not adjusted, it is used to generate a tolerance-adjusted value for comparison. If the adjusted system time value is less than the time anchor 208 then a license checkout fails because clock wind-back has been detected 213 and the process ends 215. If the adjusted system time value is not less than the time anchor 208, meaning a clock wind-back is within a designated tolerance, then the license checkout is accepted 214 and the process ends 215.

If the system time is not less than the time anchor 204 then the license is tested for an expiration date 205. If the license has an expiration date 203 the time anchor is updated with the current system time 207, the license checkout is accepted 214 and the process ends 215. If the license does not have an expiration date 203 then the start date of the license is compared to the time anchor 206. If the start date is greater than the time anchor 206, then the time anchor is updated with the system time 207, the license checkout is accepted 214 and the process ends 215. Otherwise, if the start date is not greater than the time anchor 206 the license checkout is accepted 214 and the process ends 215. A time anchor is automatically updated with the current system time 207 when a defined time period has elapsed, according to one embodiment. The defined time period may be set by an application publisher to ensure the time anchor is updated according to a desired schedule.

Figure 3A:
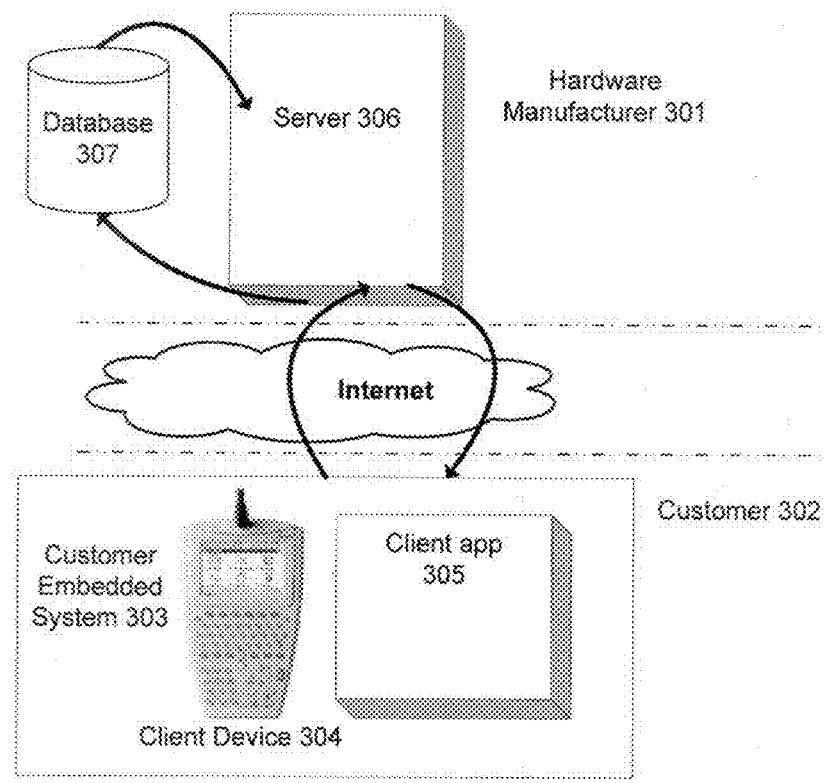
FIG. 3A is an exemplary system level diagram for an automated clock wind back recovery system, according to one embodiment.

FIG. 3A is an exemplary system level diagram for an automated clock wind back recovery system, according to one embodiment. A hardware manufacturer 301 grants licensing rights to a customer 302 possessing a device such as an embedded system 303. The embedded system 303 includes a device 304 and a client application 305. The hardware manufacturer includes a server 306 for communication over the Internet regarding license rights with the customer embedded system 303. The server 306 is also in communication with a database 307. The database 307 stores information related to licensing, among other parameters.

Figure 3B:
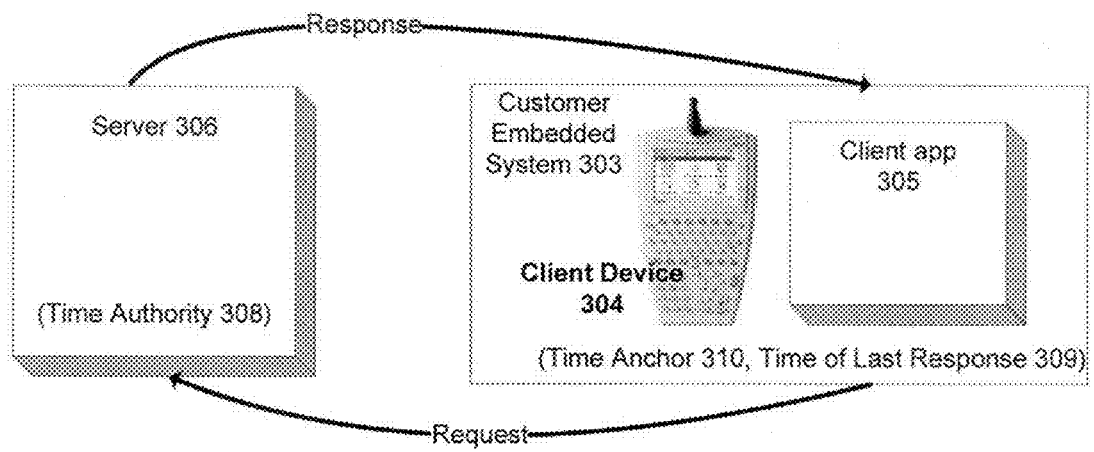
FIG. 3B is an exemplary system level diagram for communication within an automated clock wind back recovery system, according to one embodiment.

FIG. 3B is an exemplary system level diagram for communication within an automated clock wind back recovery system, according to one embodiment. A server 306 serves as a time authority 308 in an automated clock wind back recovery system, storing the trusted clock current time. The server 306 receives a request for a license from a client device 304, the server 306 replies with a response and the client device 304 stores the time of the last processed response 309 as a time anchor 310. Server 306 responses are considered to be trusted because they are signed by an application publisher, but to protect against malicious replay of previous messages the time of the last processed response 309 is also stored by the device. Subsequent responses are checked against this value before they are applied to the system—and rejected if they are out of date to prevent replays of older responses.

FIG. 4A is an exemplary flow for a time anchor update process within an automated clock wind back recovery system, according to one embodiment. A time-sensitive license is checked out 401 and the current system time is compared to a stored time anchor 402. If the current time is greater than the time anchor then the time anchor is updated from the current system time 403. If the current time is less than the time anchor (within a designated tolerance) then the time anchor is not updated from the current system time 404, according to one embodiment. According to one embodiment, a publisher may reset the time anchor to an earlier date if it is set in the future (intentionally or otherwise).

FIG. 4B is an exemplary flow for a time anchor update process within an automated clock wind back recovery system, according to one embodiment. A time-sensitive license is checked out 405 and the timestamp of a response received is compared to a timestamp of the last response applied 406. The time anchor is updated from the time of the last processed response 407 if the response received is newer.

Frequent writes to the time anchor store in device memory may not be acceptable on all devices, especially those with storage mechanisms with a low limited to number of writes.

An exemplary approach to avoid excessive writes includes designating a flag in responses to indicate whether the "most recent response time" should or should not be updated. The absence of this flag means that responses are updated and its presence means that it should not. The flag may exist in an embodiment and be optionally selected by a publisher.

Other approaches include allowing the publisher to disable clock wind-back detection for expiring licenses via a public API call, and using a publisher defined period which will limit the updates by updating the time anchor only if the time difference is greater than a configured period (for example once a day).

FIG. 5A is an exemplary flow for a permanent license evaluation within an automated block wind back recovery system, according to one embodiment. An exemplary flow results from acquisition of a permanent license and wind back or wind forward of the clock. A permanent license is acquired on a device 501 and the last processed response time is updated as well as the time anchor 502. The clock is wound back or forward 503, and when the license is processed it is found not to be time sensitive (since it is permanent) and the time anchor value is not retrieved or updated. The license continues to function 504 (the device continues to have access to the licensed application).

FIG. 5B is an exemplary flow for an expiring license evaluation within an automated block wind back recovery system, according to one embodiment. An exemplary flow results from acquisition of an expiring license and wind back of the clock. An expiring license is acquired on a device 505, this type of license includes trials. The last processed response time is updated in the time anchor 506 for non-trial licenses and a new license is added to the trusted or trial storage with a start and end date 507. The license is used 508, and the expiration period eventually lapses and an attempt to checkout a license occurs 509. A clock wind-back is detected, the clock has been wound-back to a point before the license expired 510. The clock is returned to the correct time 511.

FIG. 5C is an exemplary flow for a clock wind back process within an automated clock wind back recovery system, according to one embodiment. An exemplary flow results from wind-forward on a clock, a trial license installed and used, and the clock being wound-back to the correct time. The clock is wound forward 512 and a trial or future starting license is installed on the client system 513. A new license is created 514 in the trial or trusted storage with a start date of the future time and an end date (end date for trials). The trial is used 515 and the time anchor is updated by use of the license and its value is set in the future.

The clock is wound back to extend the duration of the trial and a license can no longer be checked out 516. The trial fails to function at this point, two example reasons being that the start date of the trial is in the future and the time anchor date is set in the future. Resolution is reached 517 when a communication from the server is received with a forced response request, to reset the trusted time to the device. When a full response is received by the client and the most recent response time is updated, so is the time anchor. The trial begins to function again in the future when the start date is reached.

FIG. 5D is an exemplary flow for a clock wind back process within an automated block wind back recovery system, according to one embodiment. An exemplary flow results from acquisition of an expiring license and clock wind-back within a designated tolerance. An expiring license is acquired on a device, including trials 518. The last processed response time is updated in the time anchor for non-trials 519. A new license is added to the trusted or trial storage with a start date and an end date 520. The license is used 521 and while the license is valid the time anchor is compared to and updated by the current system time periodically 522. The clock is woundback within a tolerance that has been configured by the publisher 523, so the license continues to be accessible. The time anchor may exceed the system clock, but it is by less than the allowed tolerance. Usage of the license, according to one embodiment, does not cause the time anchor to be updated until the system clock again exceeds the time anchor.

Recovery from a detected wind back or wind forward can take various forms. Two examples of recovery include returning the clock to the proper value, as described above in FIGS. 5B-5C, and in situations where the time anchor value is set in the future, a new full response is be generated and applied to the client to reset the time anchor value.

A method and system for automated clock wind-back recovery are disclosed. It is understood that the embodiments described herein are for the purpose of elucidation and should not be considered limiting the subject matter of the present embodiments. Various modifications, uses, substitutions, recombinations, improvements, methods of productions without departing from the scope or spirit of the present invention would be evident to a person skilled in the art.

I claim:

1. A computer implemented method for automated clock wind back detection, comprising:

a client device accessing a server comprising a time authority that provides a trusted current time;

said client device sending a request to said server for a license having a license expiration time and an optional license start time and for said trusted current time, and said client device receiving a response thereto from said server;

said client device storing a trusted current time received in a last processed response from said server as a time anchor, wherein server responses are considered to be trusted because they are signed by an application publisher;

said client device preventing replays of older responses by checking a trusted current time in a subsequent response against the time anchor previously received from said server before applying the trusted current time in the subsequent response as a time anchor, and said client device rejecting the trusted current time in said subsequent response if the trusted current time in the response is not later than the time anchor;

updating the time anchor with a current system time at the client device when the current system time at the client device is greater than the time anchor;

not updating the time anchor from the current system time at the client device when the current system time at the client device is less than the time anchor, but within a designated tolerance;

said client device not updating the time anchor with the current system time at the client device when the client device determines that the license expiration time is not greater than the current system time at the client device, wherein a checkout of the license fails because the license has expired;

said client device updating the time anchor with the current system time at the client device when the client device determines that the license expiration time is greater than the time anchor, wherein a checkout of the license fails because the license has expired;

said client device determining if the current system time at the client device is not greater than the license expiration time and the current system time at the client device is less than the license start time, wherein a license checkout fails because the license has not started;

said client device determining if the current system time at the client device is not greater than the license expiration time nor less than the license start time, and comparing the current system time at the client device to the time anchor; and thereafter performing the steps of:

said client device determining if the current system time at the client device is less than the time anchor;

said client device calculating a value by copying the current system time at the client device and adjusting it per a designated tolerance;

said client device comparing said value to the time anchor, wherein the current system time at the client device itself is not adjusted, but it is used to generate a tolerance-adjusted value for comparison;

said client device determining if the tolerance-adjusted system time value is less than the time anchor, wherein a license checkout fails because clock wind-back has been detected;

said client device determining if the adjusted system time value is not less than the time anchor, wherein a clock wind-back is within a designated tolerance, and the license checkout is accepted;

said client device determining if the current system time at the client device is not less than the time anchor, wherein the license is tested for an expiration time;

said client device determining if the license has an expiration time and, if so, said client device updating the time anchor with the current system time at the client device, wherein the license checkout is accepted;

said client device determining if the license does not have an expiration time and, if so, said client device comparing the start time of the license to the time anchor;

said client device determining if the license start time is greater than the time anchor and, if so, said client device updating the time anchor with the current system time at the client device, wherein the license checkout is accepted; and wherein said client device determining if the start time is not greater than the time anchor, wherein the license checkout is accepted.

* * * * *